US011231581B2

(12) United States Patent
Jia et al.

(10) Patent No.: US 11,231,581 B2
(45) Date of Patent: Jan. 25, 2022

(54) NEAR EYE 3D DISPLAY WITH SEPARATE PHASE AND AMPLITUDE MODULATORS

(71) Applicant: Magic Leap, Inc., Plantation, FL (US)

(72) Inventors: Zhiheng Jia, Weston, FL (US); Hao Zheng, Weston, FL (US); Jeffrey Todd Daiker, Lafayette, CO (US); Jeremy A. Grata, Coral Springs, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/650,800

(22) PCT Filed: Sep. 26, 2018

(86) PCT No.: PCT/US2018/052882
§ 371 (c)(1),
(2) Date: Mar. 25, 2020

(87) PCT Pub. No.: WO2019/067559
PCT Pub. Date: Apr. 4, 2019

(65) Prior Publication Data
US 2020/0233214 A1    Jul. 23, 2020

Related U.S. Application Data

(60) Provisional application No. 62/564,024, filed on Sep. 27, 2017.

(51) Int. Cl.
*G02B 27/01*    (2006.01)
*G02B 5/18*    (2006.01)
*G02B 27/44*    (2006.01)

(52) U.S. Cl.
CPC .......... *G02B 27/0101* (2013.01); *G02B 5/18* (2013.01); *G02B 27/0172* (2013.01); *G02B 27/44* (2013.01); *G02B 2027/0174* (2013.01)

(58) Field of Classification Search
CPC ........ G02B 27/0101; G02B 5/32; G02B 5/18; G02B 27/0172; G02B 27/0176; G02B 27/44
See application file for complete search history.

(56) References Cited

U.S. PATENT DOCUMENTS 5,521,748 A   5/1996   Sarraf
6,850,221 B1   2/2005   Tickle
(Continued)

FOREIGN PATENT DOCUMENTS

WO   WO 2008/068900   6/2008
WO   WO 2019/067559   4/2019

OTHER PUBLICATIONS

International Search Report and Written Opinion for PCT Application No. PCT/US2018/052882, dated Dec. 11, 2018.
(Continued)

*Primary Examiner* — Fred Tzeng
(74) *Attorney, Agent, or Firm* — Knobbe, Martens, Olson & Bear, LLP

(57) ABSTRACT

Augmented reality glasses include near eye displays the include sources of imagewise amplitude modulated light optical coupled to spatial phase modulators or active zone plate modulators and optically coupled to eye coupling optics. The sources of imagewise amplitude modulated light can include emissive 2D display panels or light sources coupled to imagewise amplitude modulators. The eye coupling optics can include volume holographic diffraction gratings.

14 Claims, 11 Drawing Sheets

(56) References Cited

U.S. PATENT DOCUMENTS

| | | |
|---|---|---|
| 8,547,615 B2 | 10/2013 | Leister |
| 9,081,426 B2 | 7/2015 | Armstrong |
| 9,215,293 B2 | 12/2015 | Miller |
| 9,279,984 B2 | 3/2016 | Aiki et al. |
| 9,335,548 B1 | 5/2016 | Cakmakci et al. |
| 9,348,143 B2 | 5/2016 | Gao et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,740,167 B2 | 8/2017 | Leister et al. |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 10,877,437 B2* | 12/2020 | Gelman ............... G03H 1/2294 |
| 2005/0007550 A1* | 1/2005 | Turkov .................. A61H 5/00 351/203 |
| 2006/0028436 A1 | 2/2006 | Armstrong |
| 2007/0081123 A1 | 4/2007 | Lewis |
| 2008/0239420 A1* | 10/2008 | McGrew ............. G02B 5/1828 359/11 |
| 2009/0128901 A1 | 5/2009 | Tilleman et al. |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0222384 A1* | 8/2013 | Futterer .................. G02B 5/32 345/426 |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0241707 A1 | 8/2015 | Schowengerdt |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0037146 A1* | 2/2016 | McGrew ............. G02B 27/0172 606/27 |
| 2016/0379606 A1* | 12/2016 | Kollin ................... G06T 3/4038 345/428 |
| 2017/0094265 A1 | 3/2017 | Mullins et al. |
| 2017/0219828 A1 | 8/2017 | Tsai et al. |
| 2018/0259904 A1* | 9/2018 | Georgiou ................. G03H 1/02 |
| 2019/0227492 A1* | 7/2019 | Kroll .................. G02B 27/0101 |
| 2019/0250439 A1* | 8/2019 | Urey .................. G02B 27/0172 |
| 2019/0369403 A1* | 12/2019 | Leister .................... G03H 1/268 |
| 2020/0049995 A1* | 2/2020 | Urey .................. G02B 27/0172 |
| 2020/0166754 A1* | 5/2020 | Leister ............... G02B 27/0176 |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. htttps://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

International Preliminary Report on Patentability for PCT Application No. PCT/US2018/052882, dated Mar. 31, 2020.

\* cited by examiner

1200

1300

1400

1500

NEAR EYE 3D DISPLAY WITH SEPARATE PHASE AND AMPLITUDE MODULATORS

CROSS-REFERENCE TO RELATED APPLICATIONS

This application is a national stage application under 35 U.S.C. § 371 of International Application No. PCT/US2018/052882, filed on Sep. 26, 2018, which published in English as WO 2019/067559 A1 on Apr. 4, 2019 and which claims priority benefit of U.S. Patent Application No. 62/564,024 filed on Sep. 27, 2017.

TECHNICAL FIELD

The invention pertains to near eye displays. More particularly this invention pertains to near eye three-dimensional (3D) displays.

BACKGROUND ART

Since the advent of the smartphone, the great utility of having a versatile and always available device capable of general purpose computing and multimedia communication has been realized by the public at large. Nonetheless, a pronounced drawback of smartphones is the relatively small screen size. Smartphone display screens are a small fraction of the size of even small laptop computer screens.

It is now contemplated that smartphones will eventually be replaced or indispensably supplemented by augmented reality glasses that will, among other things, effectively provide users with a relatively large field of view 3D imagery output system that is accessible to users, at will, whether for business or entertainment purposes.

Beyond merely exceeding the screen size afforded by a laptop and without the encumbrance of carrying a laptop, augmented reality glasses will provide new mixed reality applications that seamlessly integrate the real world and virtual content. This not only preserves the user's engagement with the real world discouraging the social phenomenon of withdrawal from real world interaction that is sometimes associated with excessive use of smartphones but also enables new types of augmentation of the physical world, such as, for example: automatically generated contextually relevant information overlaid on automatically recognized real world objects; communication between remotely situated persons, through 3D avatar's of each party displayed to the other party; and mixed reality games, that include virtual content behaving realistically, e.g., respecting boundaries of physical objects in the real world.

SUMMARY

One aspect of augmented reality glasses is that the virtual content is displayed via transparent eyepieces. One type of transparent eyepiece is based on waveguides that include see-through diffractive optical elements for controlling the propagation of light that carries virtual imagery. One issue with such waveguide eyepieces is the low efficiency with which they are able to transfer light carrying virtual imagery to a user's eyes. Low efficiency leads to higher power consumption, and thus shorter battery life and associated thermal management requirements.

Additionally, in order to enhance the realisticness of virtual content, it is desirable to display content at different depths. Properly displaying content at a certain distance from the user calls for curving the wavefront of light used to generate virtual images of the content. The curvature is inversely related to the virtual image distance. In order to achieve multiple virtual image distances when using waveguide-based eyepieces, a stack of waveguides, each of which has different out-coupling optics, is used. The latter approach practically limits the virtual distances that can be provided to a small finite number, e.g., 2 chosen distances.

Embodiments described here improve efficiency of coupling 3D imagery through an optics train and to a user's eye(s) and are further more versatile in terms of being able to control the depth of virtual images.

Embodiments of the invention provide augmented reality glasses including near eye displays that include a source of imagewise intensity modulated light coupled to a spatial phase modulator that can impart a spatially varied phase modulation across a beam of light received from the source of imagewise intensity modulated light. The spatial phase modulator is further coupled to an eye coupling optic. The source of imagewise amplitude modulated light, can for example, take the form of a light source coupled to a 2D pixelated amplitude modulator such as an Liquid Crystal on Silicon (LCoS) modulator or a Digital Micromirror Device (DMD) modulator, or emissive 2D display panel such as an Organic Light Emitting Diode (OLED) display panel. The spatial phase modulator can take the form of an LCoS modulator as well. The eye coupling optic can take the form of an off-axis volume holographic diffraction grating which receives light at a relatively high incidence angle compared to the angle at which it redirects light toward a user's eye, thereby allowing parts of the near eye display to be positioned to the side of the user's eye. In some embodiments, a path of light between the light source and the eye coupling optic can reach the amplitude modulator before reaching the spatial phase modulator. The near eye display can further comprise a beam splitter disposed between the amplitude modulator and the spatial phase modulator.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained; a more particular description of the present inventions briefly described above will be rendered by reference to specific embodiments thereof, which are illustrated in the accompanying drawings.

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figures 1, 2:
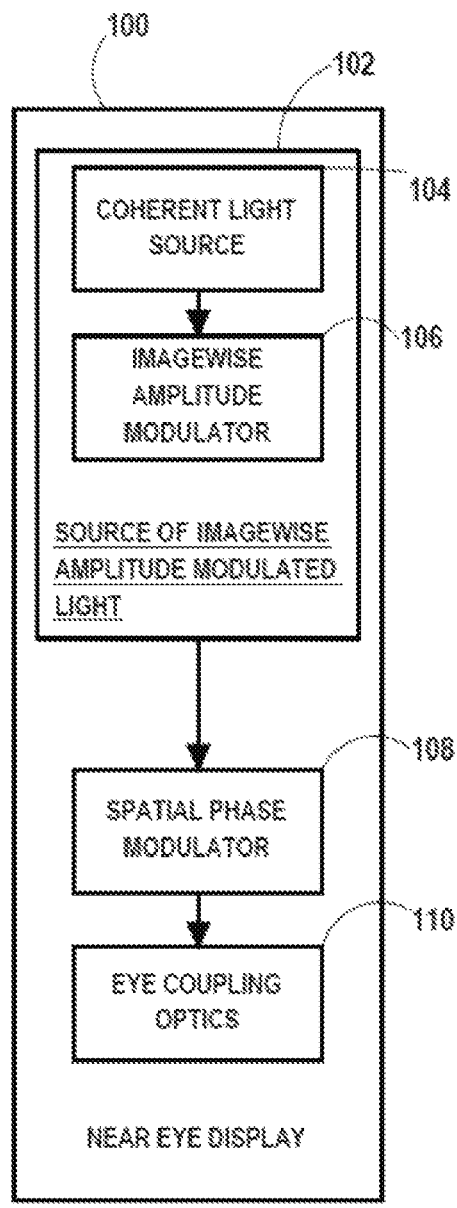
FIG. 1 is a block diagram of a near eye display according to some embodiments of the invention.
FIG. 2 is a block diagram of a near eye display according to some embodiments of the invention.

FIG. 1 is a block diagram of a near eye display 100 according to some embodiments of the invention. Referring to FIG. 1, the near eye display 100 includes a source of imagewise amplitude modulated light 102. As shown, the source of imagewise amplitude modulated light 102 includes a coherent light source 104 (e.g., one or more laser diodes (LDs)) and an imagewise amplitude modulator 106. The imagewise amplitude modulator 106 can for example comprise an LCoS modulator, a DMD modulator, or a transmissive liquid crystal modulator. Alternatively to what is shown in FIG. 1, the source of imagewise amplitude modulated light can take the form of a pixelated emissive display panel such as an OLED display panel or a micro LED display panel.

The source of imagewise amplitude modulated light 102 is optically coupled to a spatial phase modulator 108. In the present specification, the term "optically coupled" can include propagation along an optical path that may include: free space and/or one or more optical elements, such as lens(es), mirror(s), and light pipe(s), for example. The spatial phase modulator 108 can, for example, include a Zero-Twist Electrically Controlled Birefringence Liquid Crystal (ZTECBLC) modulator. The spatial phase modulator 108 can be configured into a single Fresnel lens configuration, a configuration that includes a grid of Fresnel lenses, or a superposition of multiple Fresnel lenses in a non-grid configuration. The single Fresnel lens configuration can be used to impart a common wavefront curvature to all of the light received from the source of imagewise amplitude modulated light 102. The grid of Fresnel lenses and the non-grid multiple Fresnel lens configurations can be used to impart different wavefront curvatures to different regions of the light received from the source of imagewise amplitude modulated light. In each case, the wavefront curvature is the inverse of a virtual image distance. Setting the wavefront curvature as an inverse of the virtual image distance helps create a more realistic impression that the virtual imagery being output by the imagewise amplitude modulator 106 is at the virtual image distance relative to the user's position.

The spatial phase modulator 108 is optically coupled to eye coupling optics. The eye coupling optics can, for example, take the form of a holographic volume diffraction grating, or a specular eyepiece that includes refractive and/or reflective surfaces. The imagewise amplitude modulated light and the spatial phase modulated light may correspond to the amplitude and phase modulated components of a hologram, such as a computer generated hologram, for example.

FIG. 2 is a block diagram of a near eye display 200 according to some embodiments of the invention. The display system includes a source of imagewise amplitude modulated light 202 that includes a light source 204 optically coupled to an imagewise amplitude modulator 206. The light source 204 can, for example, include Light Emitting Diodes (LEDs) or LDs. Any other suitable light source may be used.

The source of imagewise amplitude modulated light 202 is optically coupled to an active zone plate modulator 208. The active zone plate modulator 208 can reconfigurably form zone plates of varying focal lengths by presenting zone plate patterns that include alternating light and dark rings. The active zone plate modulator 208 can be a reflective light modulator or a transmissive light modulator. The active zone plate modulator can be implemented using a DMD modulator, an LCoS modulator or a transmissive liquid crystal (LC) modulator for example. The active zone plate modulator 208 can be used to present a single zone plate pattern, a grid of multiple zone plate patterns, or a non-grid superposition of zone plate patterns. A single zone plate pattern can be used to impart wavefront curvature to imagewise modulated light that is received from the source of imagewise amplitude modulated light 202. On the other hand, multiple zone plate patterns can be used to impart different wavefront curvatures to different portions of the imagewise modulated light that is received from the source of imagewise modulated light 202. In each case, the wavefront curvature corresponds to an inverse virtual image distance imagery presented by the near eye display 200. Depth perception of imagery presented by the near eye display system is enhanced by curving the wavefront of light used to present images based on the intended distance to virtual content (e.g., animate and inanimate objects) in the presented images. In the case that multiple zone plate patterns are implemented, a first portion of the imagewise modulated light that carriers the image of a first virtual object (e.g., a book) can be diverged by a first zone plate pattern so as to have a first curvature corresponding to an inverse of a first intended distance to the first virtual object and a second portion of the imagewise modulated light carriers the image of a second virtual object (e.g., an avatar) can be diverged by a second zone plate pattern so as to have a second curvature corresponding to an inverse of a second intended distance to the second virtual object. The active zone plate modulator 208 is coupled to eye coupling optics 210.

Figure 3:
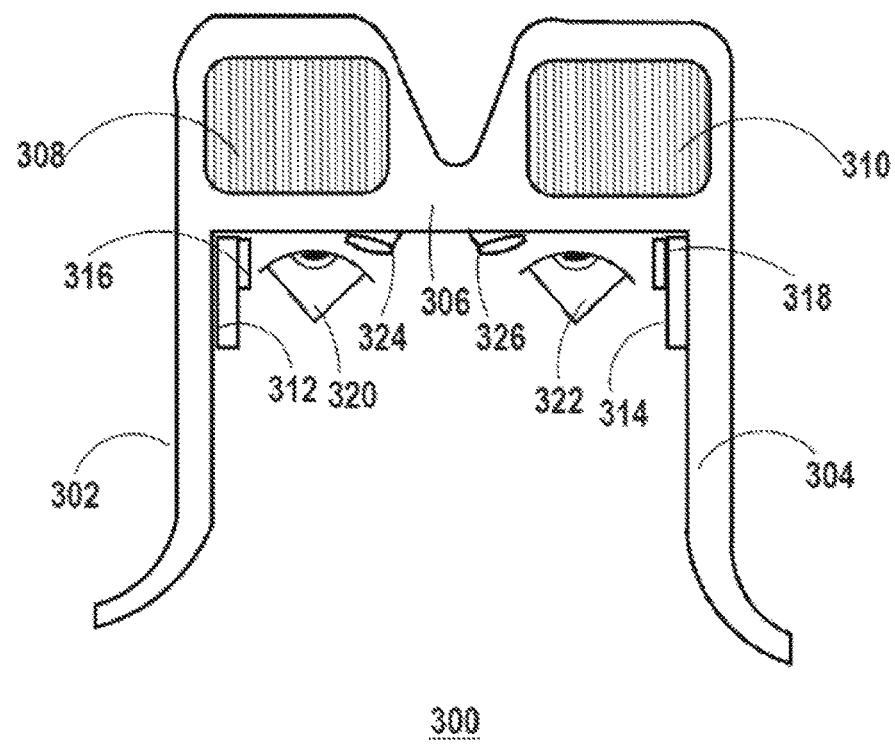
FIG. 3 shows a pair of augmented reality glasses according to some embodiments of the invention.

FIG. 3 shows a pair of augmented reality glasses 300 according to an embodiment of the invention. The augmented reality glasses 300 include a left temple 302 and a right temple 304 connected to a front frame portion 306. A left volume holographic diffraction grating eyepiece 308 and a right volume holographic diffraction grating eyepiece 310 are mounted in the front frame portion 306. A left 3D image generator 312 is mounted on the left temple 302 and a right 3D image generator 314 is mounted on right temple 304. The left 3D image generator 312 includes a left protective optical window 316 and the right 3D image generator 314 includes a right protective optical window 318. A user's left eye position 320 and right eye position 322 are schematically illustrated. The left eyepiece 308 is configured to reflect (or otherwise redirect) light from the left 3D image generator 312 toward the left eye position 320 and the right eyepiece 310 is configured to reflect (or otherwise redirect) light from the right 3D image generator 314 to the right eye position. The left and right 3D image generators 312, 314 can each embody the source of imagewise amplitude modulated light 102 in combination with the spatial phase modulator 108 or can embody the source of imagewise amplitude modulated light 202 in combination with the active zone plate modulator 208. The left and right volume holographic diffraction grating eyepieces 308, 310 are each possible embodiments of the eye coupling optics 110 and the eye coupling optics 210. A left eye tracking camera 324 and a right eye tracking camera 326 are mounted to the front frame portion 306.

Virtual content that is displayed using the left and right image generators 312, 314 can include one or more virtual objects at different depths. The eye tracking cameras 324, 326 can be used to determine which particular virtual object a user is looking at. Based on the intended depth of the particular virtual object that the user is looking at, the spatial phase modulator 108 or the active zone plate modulator 208 can be used to form a negative power lens that imparts a diverging (convex toward user) wavefront curvature to light received from the source of imagewise amplitude modulated light 102 or 202. The radius of curvature of the light is suitably set equal to the depth of the particular virtual object that the user is looking at, as determined by the eye tracking cameras 324, 326. The depth of each particular virtual object can be determined by one or more programs, e.g., augmented reality programs that generate the virtual objects. Furthermore, the negative lens pattern formed by the spatial phase modulator 108 or the active zone plate modulator 208 can be transversely shifted to deflect light such that after being redirected by the eyepieces 308, 310 the light will be incident on the user's pupil.

Figure 12:
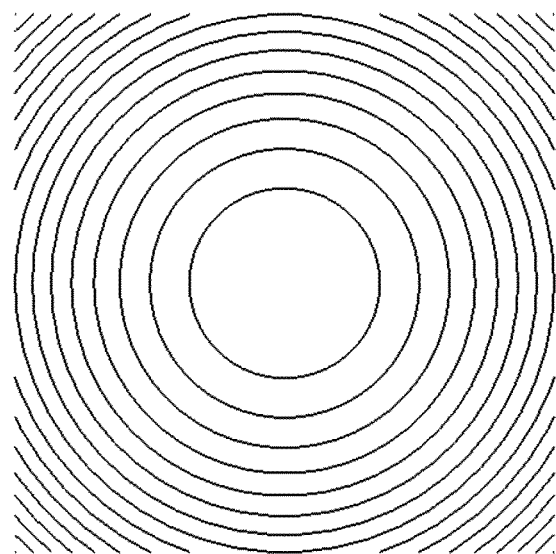
FIG. 12 is a depiction of Fresnel lens that can be formed on spatial phase modulators according to some embodiments of the invention.

Referring to FIG. 12 a diffractive Fresnel lens pattern 1200 that can be formed by the spatial phase modulator 108 of the display 100 is shown. The diffractive Fresnel lens pattern 1200 is described by a focal length. The diffractive Fresnel lens pattern can be generated in response to detection, using the eye tracking cameras 324, 326 that a user is looking at virtual content that is located at a depth (distance from the user) equal to the focal length. The focal length can be changed as needed depending on the distance between the user and the virtual content that the user is looking at. The focal length of the diffractive Fresnel lens pattern can be adjusted as the user changes the direction of their gaze such that the resulting wavefront curvature will correspond to a distance associated with virtual content that the user is currently looking at.

Figure 13:
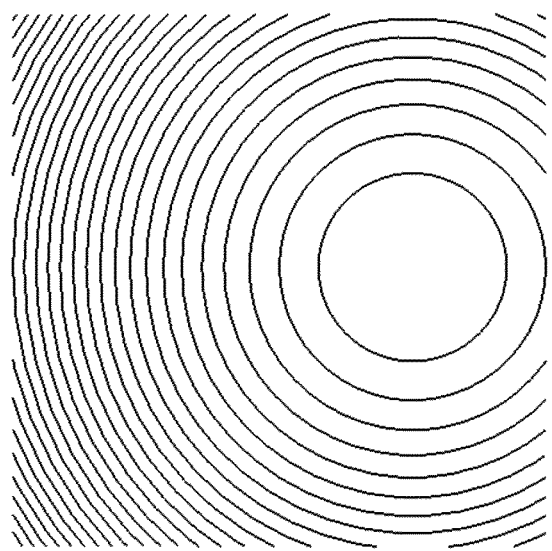
FIG. 13 is a depiction of Fresnel lens that can be formed on spatial phase modulators and which is transversely shifted from center in order to deflect light along a path to a user's eye according to some embodiments of the invention.

Referring to FIG. 13 a second Fresnel lens pattern 1300 is shown. The second lens pattern 1300 is transversely shifted relative to the first Fresnel lens pattern which is centered. The second Fresnel lens pattern is shifted transversely based on a shift in the position of the user's eye(s) as determined by the eye tracking cameras 324, 326 in order to deflect light along an optical path (that includes redirection by the eyepieces 308, 310) for appropriate viewing by the user. The Fresnel lens pattern 1300 can be shifted in any direction in order to track the user's gaze and couple into the user's eyes through the pupil(s). In some embodiments, the shift in location of one or more Fresnel lens patterns may correspond to a shift in the direction of the user's gaze, as determined by the eye tracking cameras 324, 326.

Figure 14:
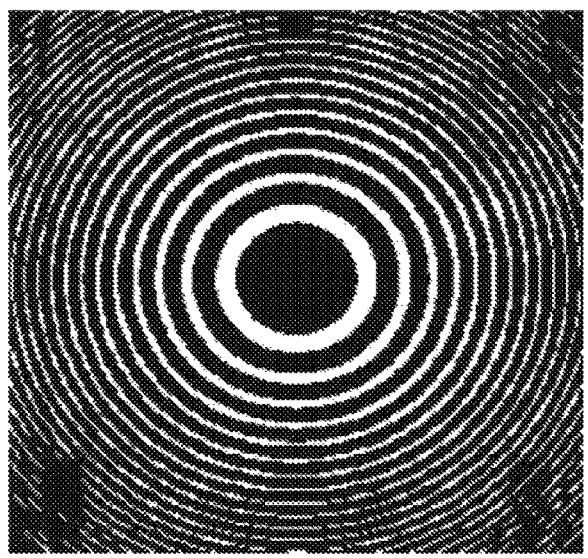
FIG. 14 is a depiction of a zone plate lens that can be formed on the active zone plate modulator included in the display shown in FIG. 2 according to some embodiments of the invention.

Referring to FIG. 14 a negative zone plate pattern 1400 is shown. The negative zone plate pattern 1400 can be formed on the active zone plate modulator 208 and can be used in lieu of the negative diffractive Fresnel pattern 1200 to impart a curvature to a wavefront of light received from the source of imagewise amplitude modulated light 202 which has a radius of curvature based on (e.g., equal to) a distance to a virtual object that a user is looking at, as determined by the eye tracking cameras 324, 326. The negative zone plate pattern 1400 can also be transversely shifted to deflect light to a user's pupil based on information as to the location of the user's pupil obtained from the eye tracking cameras 324, 326.

One of skill in the art will appreciate that while the disclosure refers to tracking a user's pupil in specific embodiments, eye imaging or positioning otherwise of other anatomy may be used. For example, a retinal image may be obtained and aggregated over time to provide a retinal map, wherein any single retinal image at a given time as obtained by an eye tracking camera 324, 326 corresponds to a gaze direction of the eye. That is, as a pupil changes a gaze direction, it will provide a variably positioned aperture through which the eye tracking camera 324, 326 will receive image data for the retina, the variable position corresponding to a new gaze direction.

Figure 15:
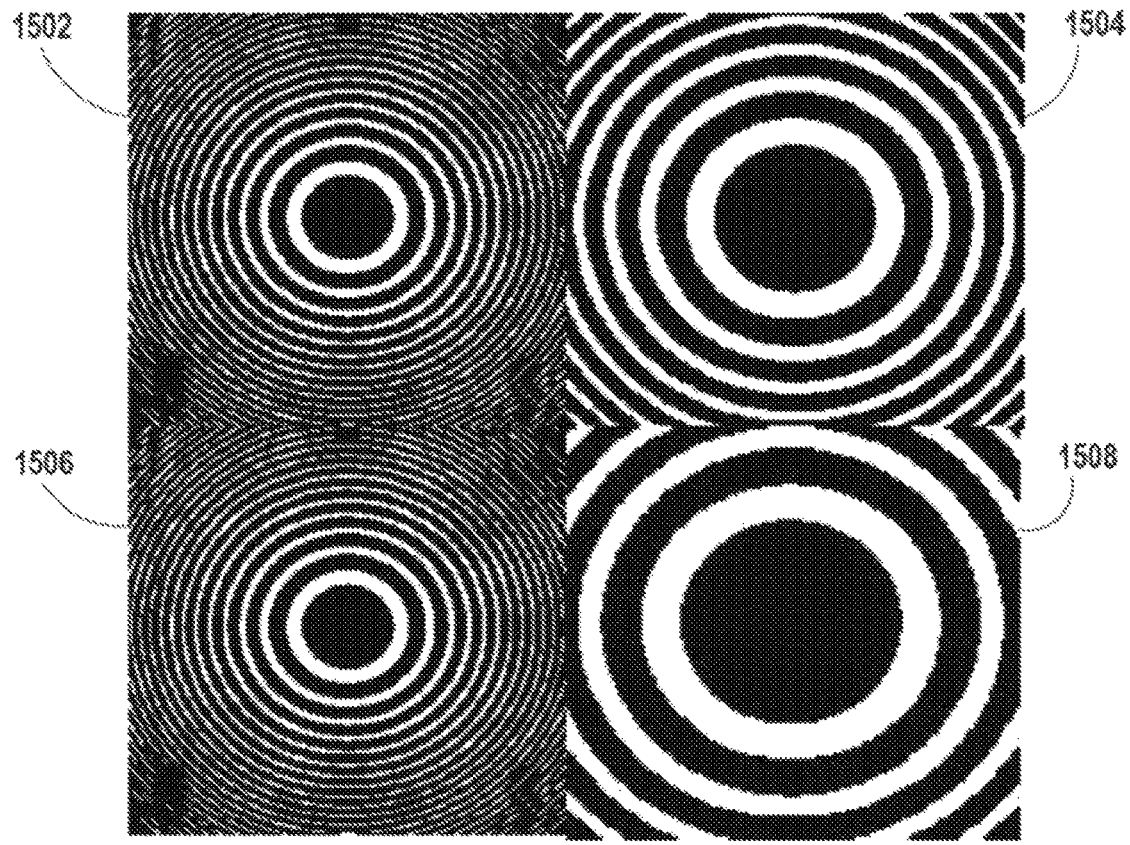
FIG. 15 is a depiction of a grid of zone plate patterns that can be formed on the active zone plate modulator included in the display shown in FIG. 2 according to some embodiments of the invention.

Referring to FIG. 15 a grid of four zone plate patterns 1500 including an upper left zone plate pattern 1502, an upper right zone plate pattern 1504, a lower left zone plate pattern 1506 and a lower right zone plate pattern 1508 are shown. In this example configuration, the upper left zone plate pattern 1502 and the lower left zone 1506 are the same and the upper right zone plate pattern 1504 and the lower right zone plate pattern 1508 are different. Each particular zone plate pattern of the four zone plate patterns 1502, 1504, 1506, 1508 has a negative focal length related to (e.g., equal to) a distance to a particular virtual object or portion of a virtual scene presented in intensity/amplitude modulated light emanating from the source of imagewise modulated light 102, 202 that is incident on the particular zone plate pattern (e.g., 1502, 1504, 1506, 1508). Thus, for example, an image of a virtual bee can be coupled through one of the zone plate patterns 1502, 1504, 1506, 1508 in the grid 1500 and an image of a virtual butterfly can be coupled through another of the zone plate patterns 1502, 1504, 1506, 1508 in the grid 1500. Although not shown in FIG. 15 each of the zone plate patterns 1502, 1504, 1506, 1508 can also be shifted as in the case of the Fresnel lens 1300 based on movement of the user's pupil in order to direct light into the user's pupil and ensure that the corresponding virtual object and zone plate pattern are aligned.

Figure 16:
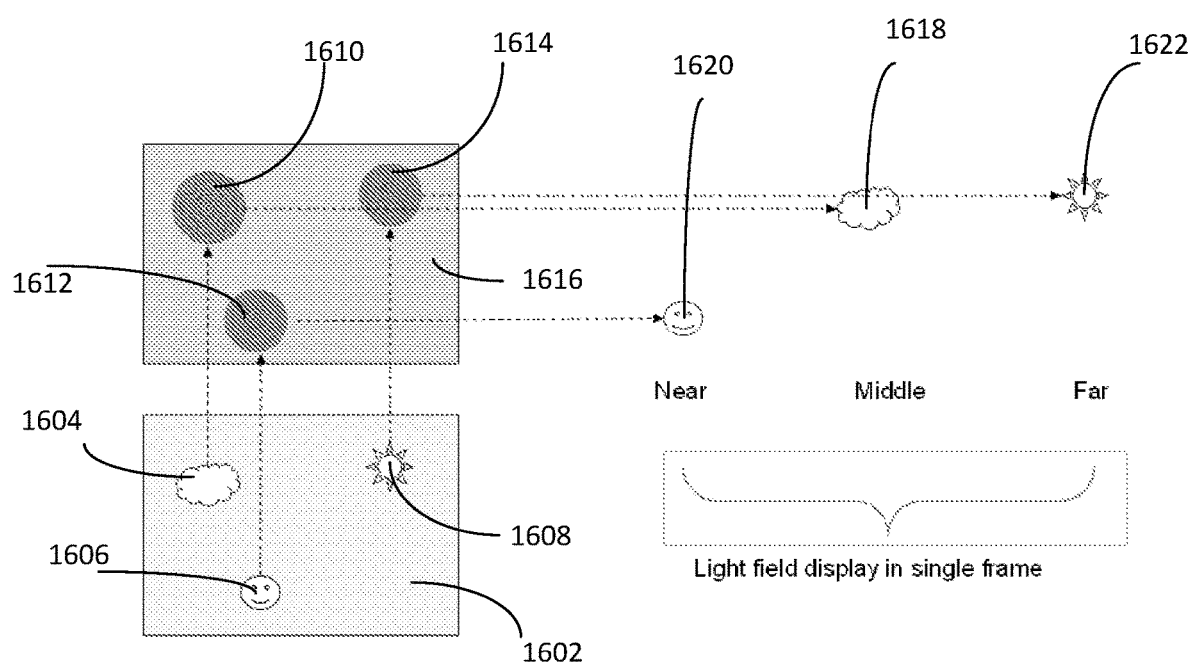
FIG. 16 is a schematic depiction of the operation of some embodiments of the invention.

FIG. 16 is a schematic depiction of the operation of certain embodiments of the invention. A light amplitude modulator 1602 imagewise modulates light to present three virtual objects. A first portion of amplitude modulated light 1604 is used to present a first virtual object, a second portion of amplitude modulated light 1606 is used to present a second virtual object and a third portion of amplitude modulated light 1608 is used to present a third virtual object. Each of the three portions of amplitude modulated light 1604, 1606, 1608 has a limited divergence angle. The limited divergence angle may be attributable due to the high degree of collimation of light (e.g., laser light) illuminating the light amplitude modulator and the limited extent to which the light amplitude modulator 1602 increases the divergence of light. The light amplitude modulator 1602 can include pixels that produce an outgoing cone of light, the divergence of which may have an upper and/or lower limit imposed by the divergence of incoming illumination, diffraction and/or by the inclusion of reflective or transmissive diffusing optical materials. The first, second and third portions of amplitude modulated light 1604, 1606, 1608 are incident on, respectively, a first 1610, a second 1612 and a third 1614 Fresnel lens pattern, which may be dynamically formed on a phase modulator 1616. Each of the dynamically formed Fresnel lens patterns 1610, 1612, 1614 has a focal length chosen to impart a particular light field curvature to the first, second and third portions of amplitude modulated light 1604, 1606, 1608. Depending on the divergence of the portions of amplitude modulated light 1604, 1606, 1608 reaching the phase modulator 1616, the dynamically formed Fresnel lens patterns 1610, 1612, 1614 can have either a positive focal length or a negative focal length. Generally, however, after interacting with the phase modulator 1616 the light will be diverging (as opposed to converging) with a radius of curvature related to virtual object distances. Note that in some embodiments the eyepieces 308, 310 can have an optical power, in which case the wavefront curvature of light reaching the user's eye positions 320, 322 is a function of both the optical power of the eyepieces 308, 310 and the optical power of dynamically formed Fresnel lens patterns 1610, 1612, 1614. In the latter case, it is possible that light exiting the phase modulator 1616 will be converging. As shown at the right of FIG. 16, a first portion of wavefront curvature controlled light 1618 is formed from the first portion of amplitude modulated light 1604 by the action of the first dynamically formed Fresnel lens pattern 1610. Similarly, a second portion of wavefront curvature controlled light 1620 is formed from the second portion of amplitude modulated light 1606 by the action of the second dynamically formed Fresnel lens 1612. A third portion of wavefront curvature controlled light 1622 is formed from the third portion of amplitude modulated light 1608 by the action of the third dynamically formed Fresnel lens 1614. In the case of the embodiment shown in FIG. 3, the three portions of wavefront curvature controlled light 1618, 1620, 1622 are optically coupled to the user's eye positions 320, 322 via the volume holographic diffraction grating eyepieces. Alternatively, other types of eyepieces may be used to couple the three portions of wavefront curvature controlled light 1618, 1620, 1622 to user eye positions. Although FIG. 16 shows three virtual objects displayed at three virtual depths, other embodiments are possible. For example, one or more virtual objects may be displayed at one or more depths utilizing one or more portions of amplitude modulated light formed by the action of one or more dynamically formed Fresnel lenses. In some embodiments, one Fresnel lens may be used to determine the depth of one virtual object or one region of virtual content. In some embodiments, one Fresnel lens may be used to determine the depth of more than one virtual object or more than one region of virtual content.

Figure 4:
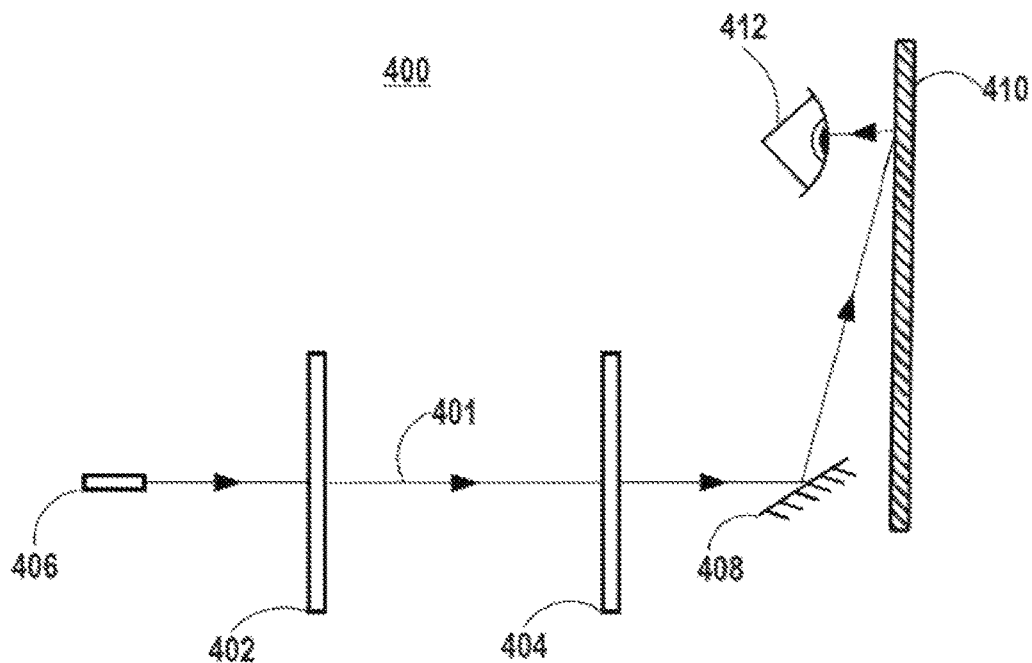
FIG. 4 is a schematic representation of a near eye display with a transmissive imagewise amplitude modulator and a transmissive phase modulator according to some embodiments of the invention.

FIG. 4 is a schematic representation of a near eye display 400 with a transmissive imagewise amplitude modulator 402 and a transmissive phase modulator 404 according to some embodiments of the invention. An optical path 401 through the display 400 is indicated in the drawing. A light source 406 is optically coupled to the transmissive imagewise amplitude modulator 402. The transmissive imagewise amplitude modulator 402 is optically coupled to the transmissive phase modulator 404. The transmissive phase modulator 404 may be optically coupled via an optical path folding mirror 408, or other suitable light redirector, to a volume holographic diffraction grating eyepiece 410 which is positioned in front a user eye position 412. According to one embodiment, the light source 406, the transmissive imagewise amplitude modulator 402, and the transmissive phase modulator 404 are used as left or right 3D image generators 312, 314. It is noted that the particular layout shown in FIG. 4 would be suitable for uses as a right image generator. According to an alternative embodiment, a second transmissive amplitude modulator that may be used to form one or more zone plate patterns may be substituted for the transmissive phase modulator 404. In some embodiments, additional light redirector components, such as collimating mirrors or lens, prisms, or beamsplitters may be added in order to direct light into an eye position.

Figure 5:
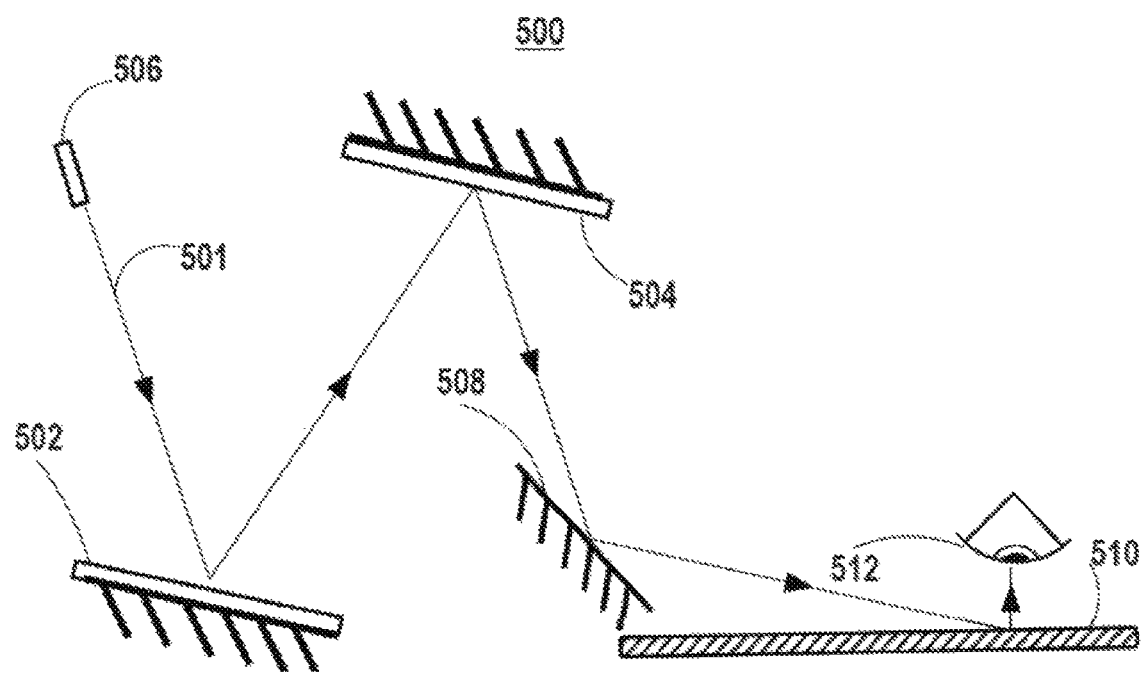
FIG. 5 is a schematic representation of a near eye display with a reflective amplitude modulator and a reflective phase modulator according to some embodiments of the invention.

FIG. 5 is a schematic representation of a near eye display 500 with a reflective amplitude modulator 502 and a reflective phase modulator 504 according to an embodiment of the invention. An optical path 501 through the display 500 is indicated. A light source 506 is optically coupled to the reflective amplitude modulator 502. Amplitude modulated light reflected by the reflective amplitude modulator 502 is incident on the reflective phase modulator 504. Amplitude and phase modulated light that is redirected by the reflective phase modulator 504 is directed via an optical path folding mirror 508, or other suitable light redirector, to a volume holographic diffractive grating eyepiece 510 which redirects the light received from the optical path folding mirror 508 to a user's eye position 512. In some embodiments, additional light redirector components, such as collimating mirrors or lens or prisms or beamsplitters or polarization selective filters or waveplates may be disposed along optical path 501 as light is directed to an eye position.

The reflective amplitude modulator 502 can, for example, be an LCoS modulator or a DMD modulator. The reflective phase modulator 504 can, for example, be a Zero-Twist Electrically Controlled Birefringence (ZTECB) LCoS modulator. According to an alternative embodiment, a second reflective amplitude modulator that is used to form one or more zone plate patterns, as discussed above in the context of FIG. 2, is substituted for the reflective phase modulator 504.

Figure 6:
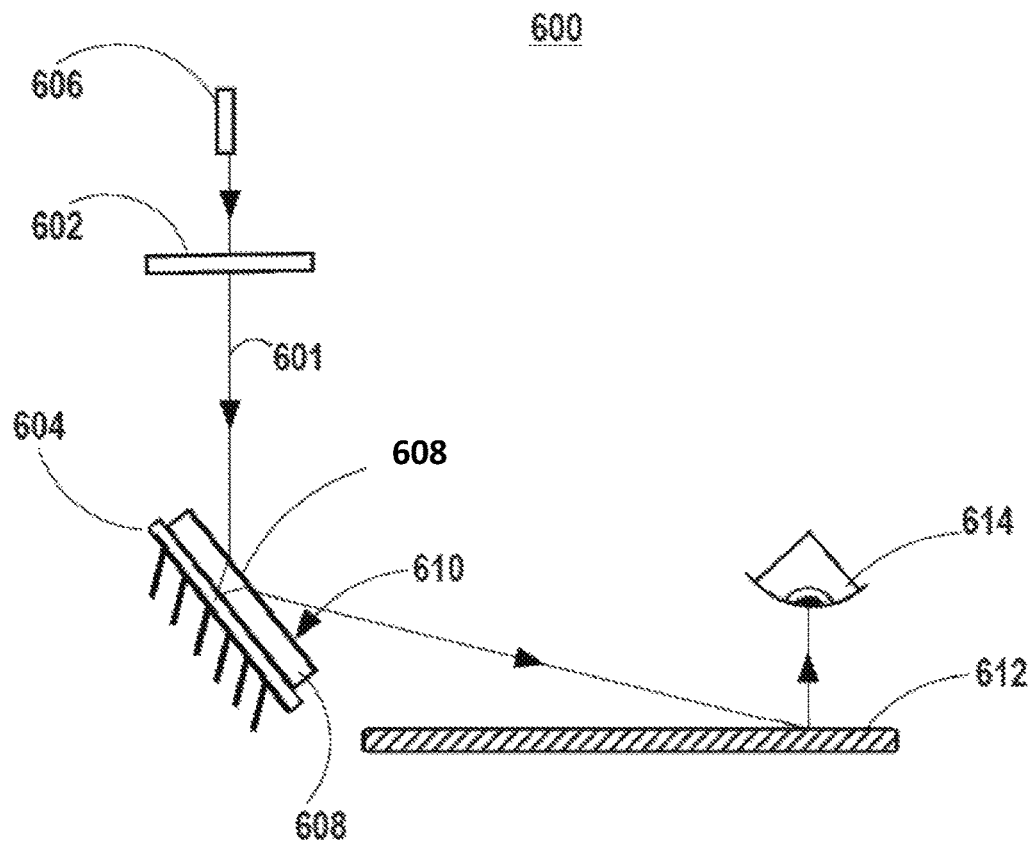
FIG. 6 is a schematic representation of a near eye display with a transmissive amplitude modulator and a reflective phase modulator according to some embodiments of the invention.

FIG. 6 is a schematic representation of a near eye display 600 with a transmissive amplitude modulator 602 and a reflective phase modulator 604 according to an embodiment of the invention. An optical path 601 through the display 600 is indicated. A light source 606 is optically coupled to the transmissive amplitude modulator 602. Light from the light source 606, that is amplitude modulated in the course of being transmitted through the transmissive amplitude modulator 602, is incident on a cover window 608 overlying the reflective phase modulator 604. An outer surface 610 of the cover window 608 may be provided with an antireflection coating (not visible in FIG. 6). The cover window 608, having an index of refraction greater than air, may function to reduce incidence angles on the reflective phase modulator 604. Light reflected through the cover window 608 by the reflective phase modulator 604 is incident on a volume holographic diffractive grating eyepiece 612. The holographic diffractive grating eyepiece 612 may be positioned in front of an eye position 614. The holographic diffractive grating eyepiece 612 may function to reflect light that has been amplitude modulated by the transmissive amplitude modulator 602 and phase modulated by the reflective phase modulator 604 toward the eye position 614. In some embodiments, additional light redirector components, such as those mentioned previously with respect to FIGS. 4-5, may be added in order to direct light or control polarization along an optical path. The transmissive amplitude modulator 602 can, for example, be a liquid crystal modulator. The reflective phase modulator can for example be a ZTECB LCoS modulator. Note that according to an alternative embodiment a reflective amplitude modulator that is used to form one or more zone plate patterns, as discussed above in the context of FIG. 2, may be substituted for the reflective phase modulator 610.

Figure 7:
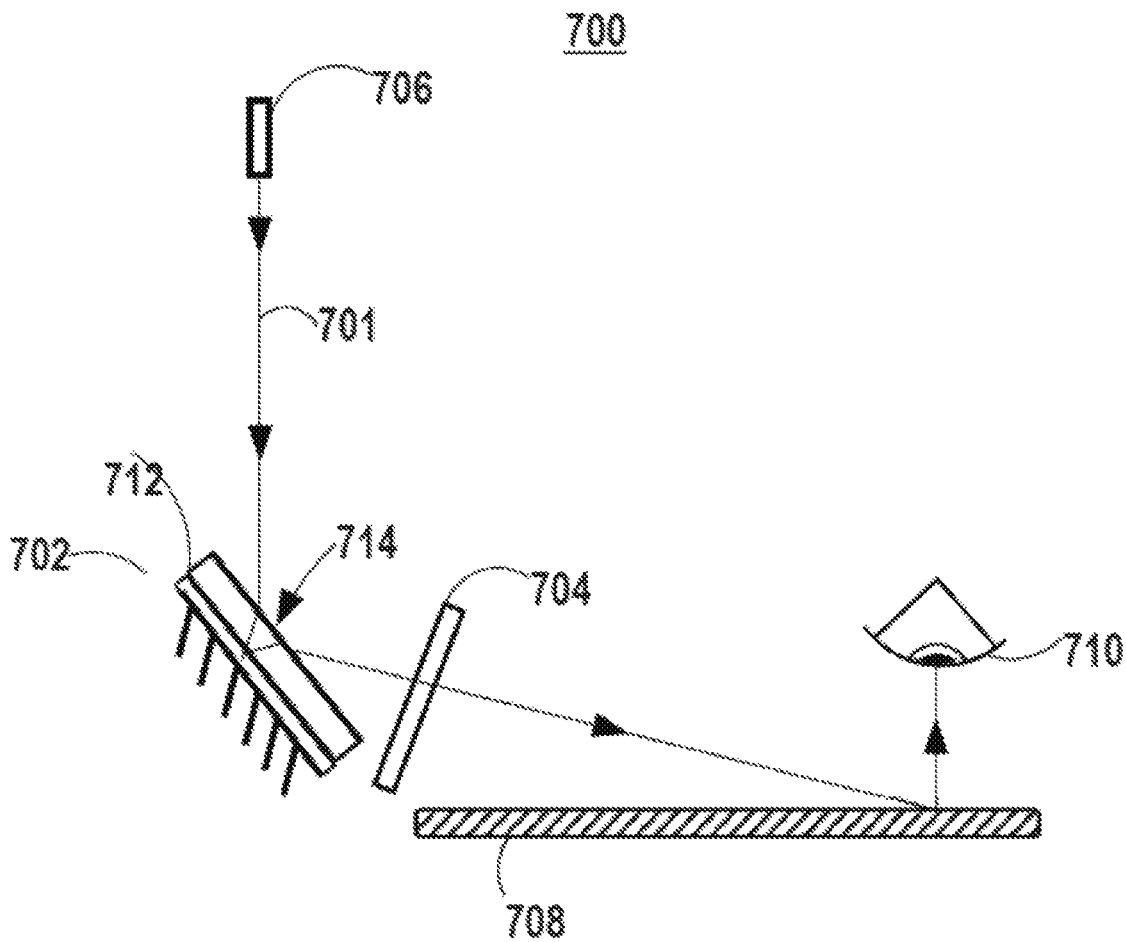
FIG. 7 is a schematic representation of a near eye display with a reflective amplitude modulator and a transmissive phase modulator according to some embodiments of the invention.

FIG. 7 is a schematic representation of a near eye display 700 with a reflective amplitude modulator 702 and a transmissive phase modulator 704 according to an embodiment of the invention. An optical path 701 through the display 700 is indicated. A light source 706 is optically coupled to the reflective amplitude modulator 702. A cover window 712 is provided over the reflective amplitude modulator 702. The cover window 712, by virtue of having an index of refraction greater than 1, may function to reduce the angle of incidence on the reflective amplitude modulator. An antireflection coating (not visible in FIG. 7) can provided on an outer surface 714 of the cover window 712. Light from the light source 706 that is amplitude modulated and reflected by the reflective amplitude modulator 702 is directed through the transmissive phase modulator 704 to a volume holographic diffractive grating eyepiece 708 and redirected by the holographic diffractive grating eyepiece 708 toward a user's eye position 710. In some embodiments, additional light redirector components, such as those mentioned previously with respect to FIGS. 4-6, may be added in order to direct light or control polarization along an optical path.

Figure 8:
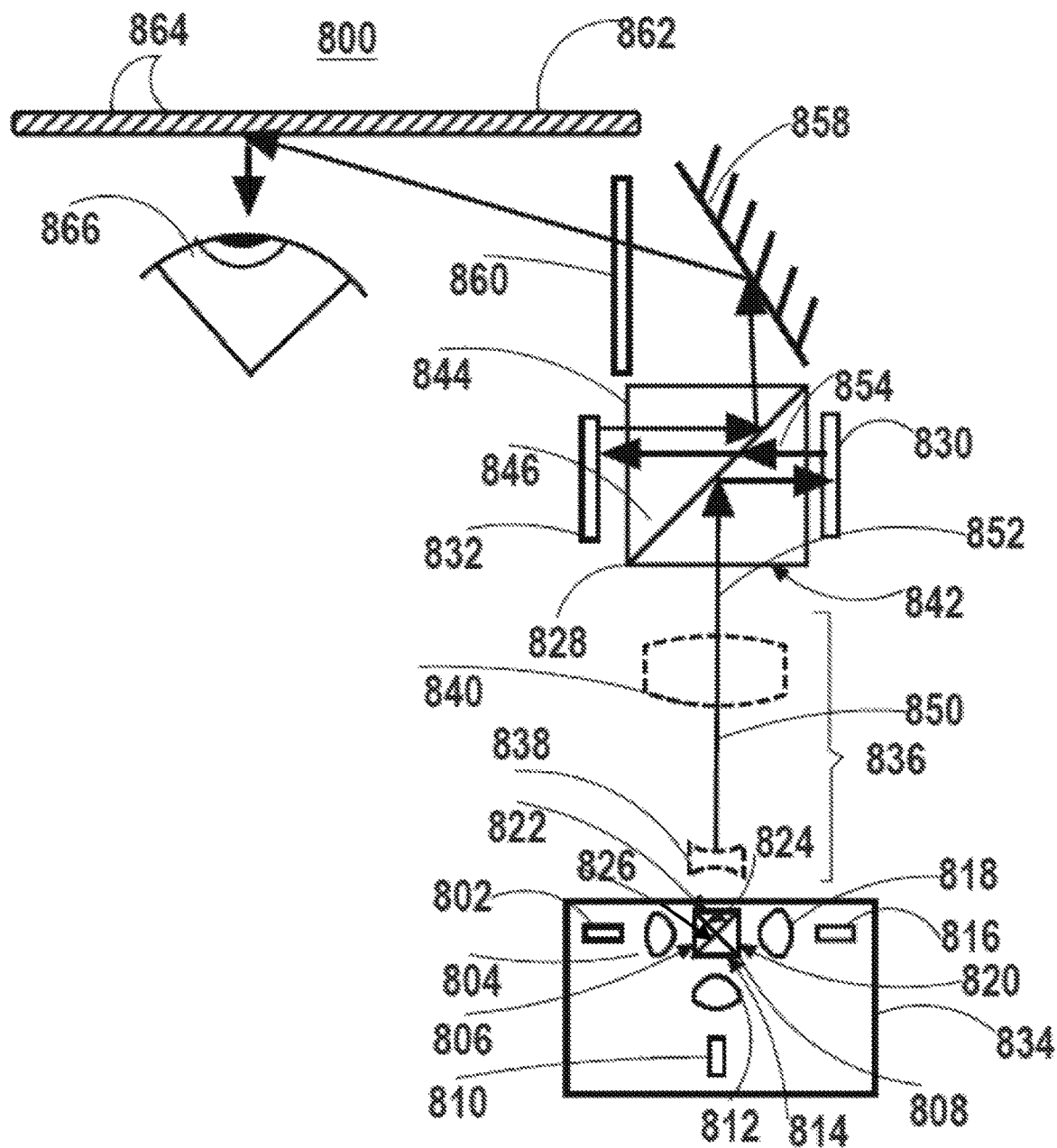
FIG. 8 is a schematic representation of a near eye display that includes a beam splitter between a LCoS amplitude modulator and an LCoS phase modulator according to some embodiments of the invention.

FIG. 8 is a schematic representation of a near eye display 800 that includes a beam splitter 828 between an LCoS amplitude modulator 830 and an LCoS phase modulator 832 according to another embodiment of the invention. A light engine 834 serves as a Red-Green-Blue (RGB) light source for the near eye display 800, although other suitable light engine configurations may be used. Referring to FIG. 8, in some embodiments, a red laser diode 802 is optically coupled through a red laser collimating lens 804 into a red light input face 806 of a Red-Green-Blue (RGB) dichroic combiner cube 808. A green laser diode 810 is optically coupled through a green laser collimating lens 812 into a green light input face 814 of the RGB dichroic combiner cube 808. Similarly, a blue laser diode 816 is optically coupled through a blue laser collimating lens 818 into a blue light input face 820 of the RGB dichroic combiner cube 808. The RGB dichroic combiner cube 808 has an output face 822. The RGB dichroic combiner cube 808 includes a red reflecting dichroic mirror (short wavelength pass mirror) 824 set at 45 degrees so as to reflect light from the red laser diode 802 through the output face 822. The RGB dichroic combiner cube 808 also includes blue reflecting dichroic mirror (long wavelength pass) 826 set at 135 degrees (perpendicular to red reflecting dichroic mirror 824) so as to reflect light from the blue laser diode 816 to the output face 822. Light from the green laser diode 810 passes through (is transmitted by) the red reflecting dichroic mirror 824 and the blue reflecting dichroic mirror 826 to the output face 822. The red reflecting dichroic mirror 824 and the blue reflecting dichroic mirror 826 can be implemented as thin film optical interference films. Alternatively, a light engine can utilize a photonic chip in lieu of the RGB combiner cube 808 in order to combine light from the laser diodes 802, 810, 816.

Light exiting the output face 822 of the RGB combiner cube can pass through an optional beam expander 836 that may include a negative lens 838 followed by a positive lens 840 which may be in a Galilean telescope configuration so as to output collimated light. Alternatively, only the negative lens 838 is provided. According to a further alternative embodiment, in lieu of the beam expander 836, laser beam shaping optics may be provided. For example, laser beam shaping optics configured to produce one or more substantially uniform rectangular cross section beams may be provided.

Light exiting the beam expander 836, or in the case of the absence thereof, light exiting light engine 834 enters an input face 842 of a beam splitter 844 and propagates to a partial reflector 846 which is embedded within beam splitter 844 which is, in some embodiments, oriented at 45 degrees. The partial reflector 846 can, for example, be a neutral density 50% reflector. Light is reflected by the partial reflector 846 to an LCoS amplitude modulator 830. An optical path 850 is indicated in FIG. 8. A reflected portion 852 of the optical path 850 extends from the light engine 834 to the LCoS amplitude modulator 830. The reflected portion 852 of the optical path 850 is reflected at the partial reflector 846. Light is selectively reflected by the LCoS amplitude modulator 830 and thereby effectively amplitude modulated. Light reflected by the LCoS amplitude modulator 830 traverses a transmitted portion 854 of the optical path 850 which crosses the partial reflector 846 and reaches an LCoS phase modulator 832, which phase modulates the light in the course of reflecting the light back toward the partial reflector 846. The phase modulator 832 can be configured as a reflective analog of a Fresnel lens, a reflective analog of a grid array of Fresnel lenses, or a reflective analog of a non-grid superposition of multiple Fresnel lenses. The phase modulator 832 serves to impart a global wavefront curvature or spatially varying local wavefront curvatures to imagewise modulated light that is received from the LCoS amplitude modulator 830. The wavefront curvature or curvatures can set one or more effective virtual image distances for the imagery output by the near eye display 800. Alternatively, the optical power of the Fresnel lens patterns formed by the phase modulator can be set taking into consideration the optical power of other optical elements along the optical path 850 such that light reaching a user's eye position 866 has a wavefront curvature or curvatures corresponding to one or more virtual objects included in imagery output by the near eye display 800. Alternatively, in lieu of the phase modulator, a second amplitude modulator may be used to generate zone plate patterns may be provided.

Light reflected by the LCoS phase modulator 832 is reflected by the partial reflector 846 toward an optical path folding mirror 858 which reflects the light through a protective optical window 860 toward a volume holographic eyepiece 862. The volume holographic eyepiece 862 includes gratings or other light redirecting features 864 oriented so as to diffract light toward the user's eye position 866. The near eye display 800 can be used in the augmented reality glasses 300 shown in FIG. 3.

Figure 9:
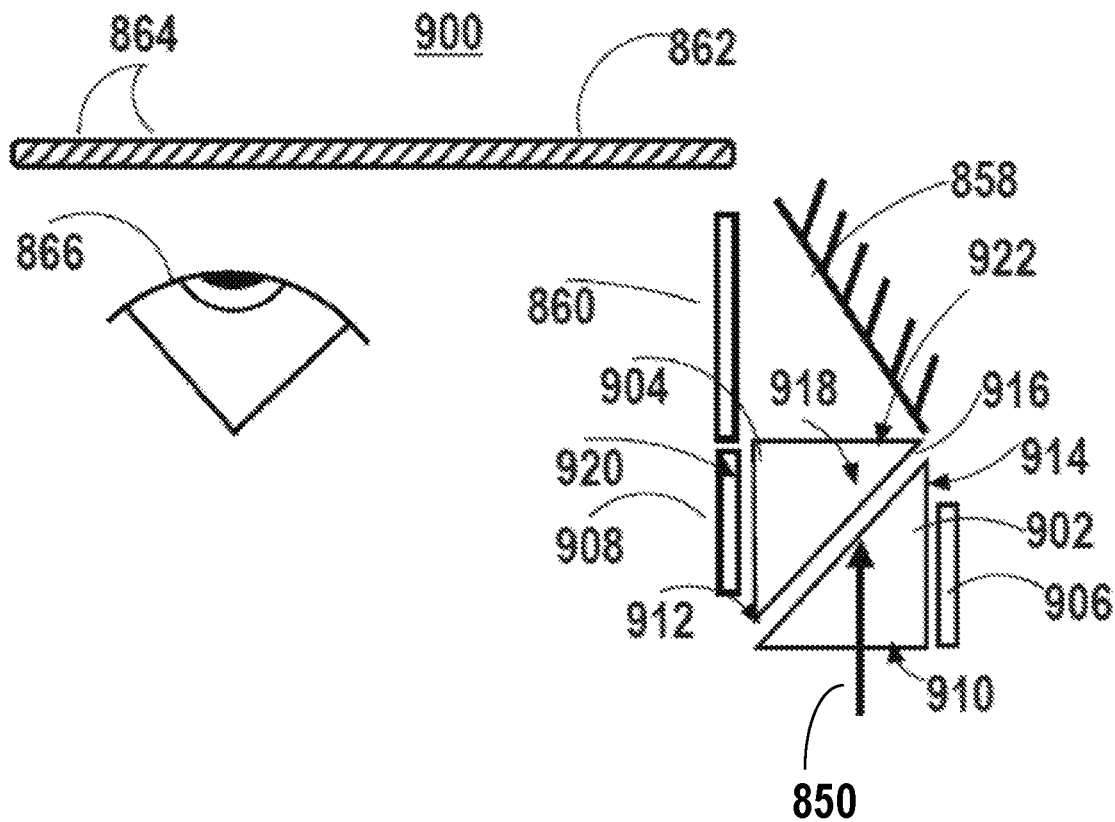
FIG. 9 is a schematic representation of a near eye display that includes a pair of prisms between a DMD light modulator and a LCoS phase modulator according to some embodiments of the invention.

FIG. 9 is a schematic representation of a near eye display 900 that includes a pair of prisms 902, 904 between a Digital Micromirror Device (DMD) light modulator 906 and a LCoS phase modulator 908 according to a yet another embodiment of the invention. Certain elements of the near eye display 900, as indicated by common reference numerals are shared with the near eye display 800 shown in FIG. 8 and reference is made to the description above for the details thereof. Light exiting the beam expander 836 or, in the case that the beam expander 836 is not used, light exiting the RGB combiner cube 808 (or an alternative light engine, such as for example one based on a photonic chip) enters an input face 910 of a first prism 902 of the pair of prisms 902, 904. The light then reaches a second angled surface 912 of the first prism 902 and is TIR reflected at the angle surface 912 to a third surface 914. Light exits the third surface and reaches the DMD light modulator 906. The DMD light modulator 906 includes a two dimensional array of micromirrors (not shown in FIG. 9) which can be oriented to one of two orientations under the control of input video signals. In an "off-state" orientation, the micromirrors reflect light at an angle that (after refraction upon reentering the third surface 914) is above the critical angle for total internal reflection (TIR) at the second angle surface 912. On the other hand in an "on-state" orientation the micromirrors reflect light at an angle that (after refraction upon reentering the third surface 914) is below the critical angle for total internal reflection (TIR) at the second angle surface 912. In order to achieve the effect of gray scale (e.g., 8 bit, 0-255 light levels) modulation the percentage of a frame period for which each micromirror is in the on-state is controlled. Light reflected by the micromirrors in the "on-state" passes through the third surface 914 crosses a gap 916 to a first angled surface 918 of a second prism 904 of the pair of prisms 902, 904 and enters the second prism 904. Thereafter the light reaches and exits a second surface 920 of the second prism 904 and impinges the LCoS phase modulator 908. The LCoS phase modulator 908 phase modulates and reflects the light back through the second surface 920 of the second prism. Because light is not incident perpendicularly on the LCoS phase modulator 908 it is also reflected at an angle and a difference between the incidence and reflected ray directions is such that when the light reaches the first angle surface 918 of the second prism, the light is above the critical angle for and therefore reflected toward a third exit surface 922 of the second prism 904. Light exiting the third exit surface 922 is propagated to the eye position 866 as described above in reference to FIG. 8.

Figure 10:
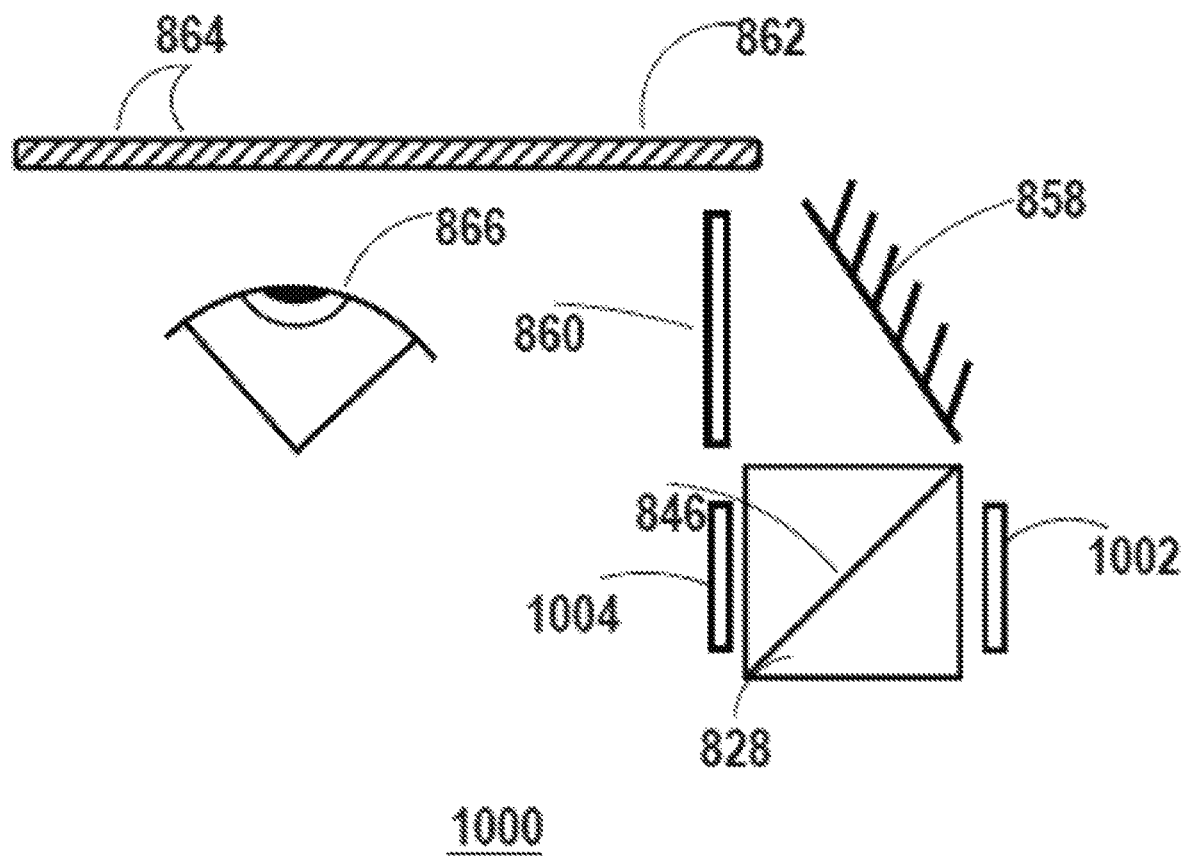
FIG. 10 is a schematic representation of a near eye display that includes a beam splitter between an OLED source of imagewise amplitude modulated light and a phase modulator according to some embodiments of the invention.

FIG. 10 is a schematic representation of a near eye display 1000 that includes a beam splitter 828 between an OLED source of imagewise intensity modulated light 1002 and a spatial phase modulator 1004 according to a still further embodiment of the invention. The OLED source of imagewise intensity modulated light 1002 which can take the form of an OLED microdisplay is an emissive display and therefore the components shown in the FIG. 8 and FIG. 9, e.g., laser diodes, collimating lenses, RGB combiner cube are not utilized in the near eye display 1000 shown in FIG. 10. A portion of the light from the OLED source of imagewise intensity modulated light 1002 is coupled through the beam splitter 828 to the spatial phase modulator 1004. The spatial phase modulator 1004 can take the form of an LCoS phase modulator. In the some embodiments, the beam splitter can take the form of a neutral density beam splitter that reflects a certain fraction (e.g., nominally ½) of incident light and transmits a certain fraction of incident light. A portion of the light that is reflected and phase modulated by the spatial phase modulator is reflected at the partial reflector 846 that is embedded in the beam splitter 828 toward the folding mirror 858 and therefore propagates to a user eye position 866 through an optical path that is described more fully above with reference to FIG. 8. In some embodiments, other suitable light redirecting components, such as those mentioned previously with respect to FIGS. 4-7, may be used in addition to or in place of folding mirror 858.

Figure 11:
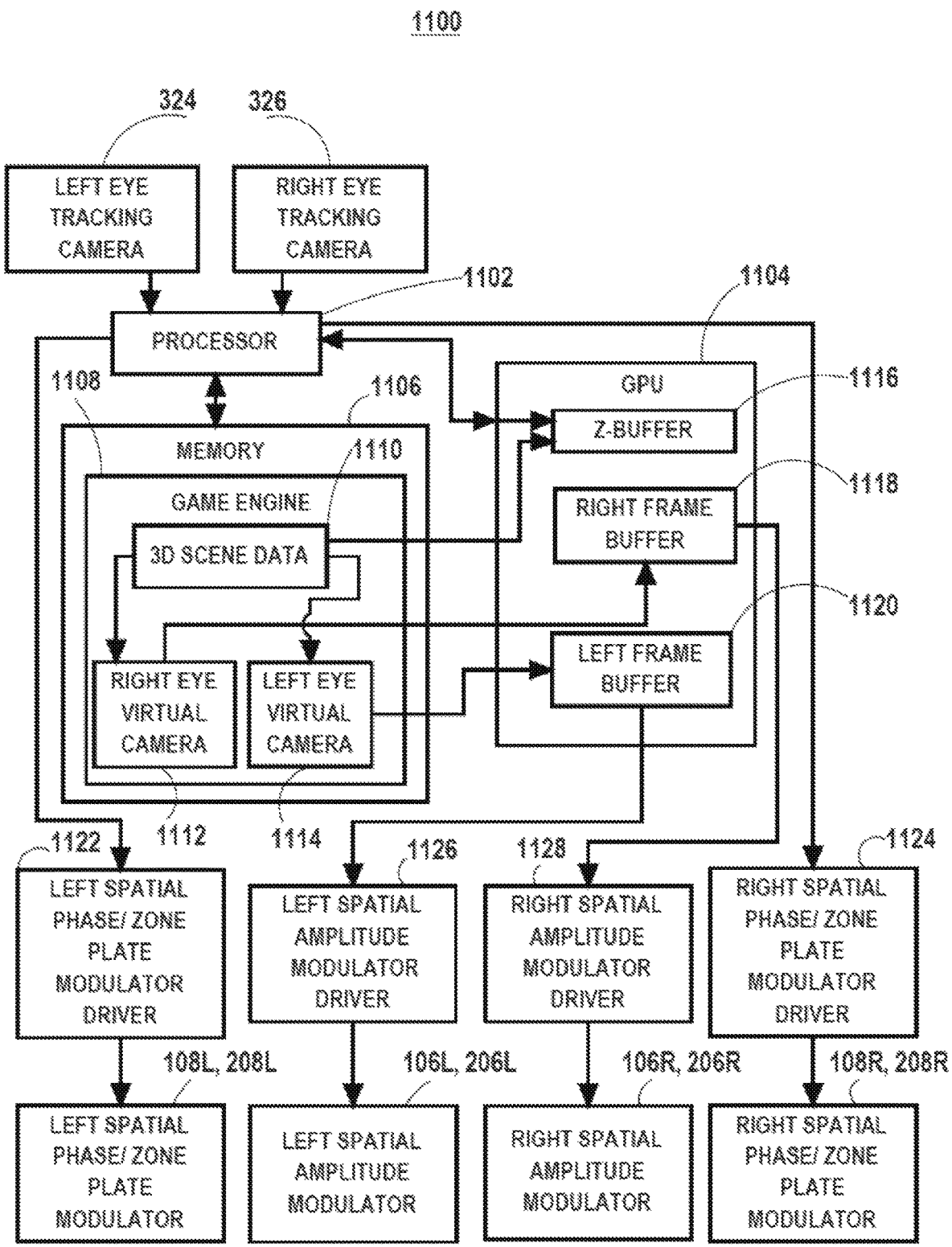
FIG. 11 is a block diagram a near eye display system according to some embodiments of the invention.

FIG. 11 is a block diagram of a near eye display system 1100 according to some embodiments of the invention. The system 1100 includes a processor 1102 coupled to the left eye tracking camera 324, the right eye tracking camera 326 a Graphics Processing Unit (GPU) 1104, and a memory 1106. The memory 1106 can, for example, include a transistor circuit, such that the combination of the processor 1102, the GPU 1104 and the memory 1106 form a larger electronic circuit. The memory 1106 may include a game engine 1108 that is executed by the processor 1102 and the GPU 1104. The game engine 1108 maintains (e.g., stores and updates) 3D scene data 1110 and implements a right eye virtual camera 1112 and a left eye virtual camera 1114 which differ from each other by a coordinate offset within a 3D virtual environment in which the 3D scene data 1110 is defined. The coordinate offset corresponds to a spacing of human eyes and may optionally be set for each user. For each of the virtual cameras 1112, 1114 a frustum fixed to a head orientation direction is defined and is used to select a portion of the 3D scene data for rendering. The GPU 1104 includes a Z-buffer 1116, a right frame buffer 1118 and a left frame buffer 1120. The right eye virtual camera 1112 is coupled to and transfers right eye scene data to the right frame buffer 1118. Similarly the left eye virtual camera 1114 is coupled to and provides left eye scene data to the left frame buffer 1120. The game engine 1108 also provides depth coordinate information for points in the 3D scene data 1110 to the Z-buffer 1116 of the GPU 1104.

The processor 1102 is further coupled to left spatial phase/zone plate modulator driver 1122 and a right spatial phase/zone plate modulator driver 1124. The GPU 1104 is coupled to a left spatial amplitude modulator driver 1126 and to a right spatial amplitude modulator driver 1128 such that right eye imagery and left eye imagery can be output from the right frame buffer 1118 and the left frame buffer 1120 to the left spatial amplitude modulator 1126 and the right spatial amplitude modulator driver 1128 respectively. The left spatial phase/zone plate modulator 1122 is coupled to the left spatial phase or zone plate modulator 108L, 208L and the right spatial phase/zone plate modulator 1124 is coupled to the right spatial phase or zone plate modulator 108R, 208R such that each modulator driver drives (e.g. controls) the respective plate modulator.

According to one mode of operation, the processor 1102 receives from the eye tracking cameras 324, 326 information indicative of a direction in which the user is looking. The processor 1102 accesses information from the Z-buffer 1116 indicative of depth of virtual content corresponding to, or closest to the direction in which the user is looking. The processor 1102 then transmits a Fresnel lens pattern, or zone plate pattern, having a focal length based on the depth of the virtual content corresponding to, or closest to the direction in which the user is looking to the spatial phase/zone plate modulator drivers 1122, 1124. The focal length of the Fresnel lens or zone plate pattern transmitted to the drivers 1124, 1124 is set in consideration of the optical power of any other optical elements (e.g., the eyepieces 308, 310) in the path between the spatial amplitude modulators 106L, 206L, 108R, 208R and the user's eye position, such that the curvature of the wavefront of light reaching the user's eye will be the inverse of the value from the Z-buffer associated with (corresponding to, or closest to) the direction in which the user is looking. Furthermore the Fresnel lens or zone plate pattern that is transmitted to the spatial phase/zone plate modulator drivers is, in some embodiments, shifted (as shown, for example, in FIG. 13) to steer light towards a user's pupil based on information as the user's instantaneous pupil position obtained from the eye tracking cameras 324, 326.

According to an alternative embodiment the processor 1102 accesses information from the Z-buffer indicative of depth of multiple virtual objects. The processor 1102 then generates a grid of Fresnel lens patterns or zone plate patterns wherein each of multiple Fresnel lens patterns or zone plate patterns has a focal length selected to set a curvature of light reaching the user's eye positions to a value matching a distance of a corresponding virtual object as based on information accessed from the Z-buffer. According to a variation on the preceding embodiment, multiple Fresnel lens patterns or zone plate patterns are positioned in a non-grid arrangement.

Optical coupling referred to hereinabove can include coupling through free space propagation of light between optical components that are relatively positioned such that light propagating from one component is received by a second component. Imagewise intensity modulated light, imagewise modulated light, amplitude modulated light, imagewise amplitude modulated light, and imagewise modulated light are used interchangeably in the present application to indicate image data encoded in light that may change amplitude (i.e. intensity for a given wavelength) as an image changes over time.

What is claimed is:

1. A near eye display system comprising:
   a light source,
   a spatial amplitude modulator,
   a spatial phase modulator,
   a phase modulator driver coupled to the spatial phase modulator, wherein the phase modulator driver is configured to generate a diffractive lens pattern on the spatial phase modulator, wherein the phase modulator driver is configured to receive depth information and to generate the diffractive lens pattern based on the depth information, and
   an eye coupling optic, wherein the light source is optically coupled to the eye coupling optic through the spatial amplitude modulator and the spatial phase modulator.

2. The near eye display system according to claim 1, further comprising an optical path from the light source to the eye coupling optic, wherein the optical path first reaches the spatial amplitude modulator before reaching the spatial phase modulator.

3. The near eye display system according to claim 1, wherein the light source includes a laser diode.

4. The near eye display system according to claim 1, wherein the eye coupling optic comprises a diffraction grating.

5. The near eye display system according to claim 4, wherein the diffraction grating comprises a volume holographic grating.

6. The near eye display system according to claim 1, wherein the spatial phase modulator comprises a Liquid Crystal on Silicon (LCoS) modulator.

7. The near eye display system according to claim 6, wherein the spatial amplitude modulator comprises a Liquid Crystal on Silicon (LCoS) modulator.

8. The near eye display system according to claim 1, wherein the spatial amplitude modulator comprises a Digital Micromirror Device (DMD).

9. The near eye display system according to claim 8, further comprising a prism disposed between spatial amplitude modulator and the spatial phase modulator.

10. The near eye display system according to claim 1, further comprising a beam splitter located between the spatial amplitude modulator and the spatial phase modulator,
    wherein there is an optical path from the light source to the eye coupling optic,
    wherein a reflected portion of the optical path that is reflected by the beam splitter extends from the light source to a first component,
    wherein a transmitted portion of the optical path that is transmitted through the beam splitter extends from the first component to a second component.

11. The near eye display system according to claim 10, wherein the first component is the spatial amplitude modulator, wherein the second component is the spatial phase modulator.

12. A method of generating virtual content comprising:
    generating light via a light source,
    modifying an amplitude of the light via a spatial amplitude modulator, wherein the output is an amplitude modulated light,
    receiving depth information,
    generating a diffraction lens pattern on a spatial phase modulator, the diffraction lens pattern based on the depth information,
    modifying a phase of the amplitude modulated light via the spatial phase modulator, wherein the output is an amplitude and phase modulated light, and
    coupling the amplitude and phase modulated light to an eye via an eye.

13. The method of claim 12, further comprising reflecting the light through at least one prism disposed between spatial amplitude modulator and the spatial phase modulator.

14. The method of claim 12, further comprising splitting the light through at least one beam splitter disposed between spatial amplitude modulator and the spatial phase modulator.

* * * * *